United States Patent
Zarges et al.

(10) Patent No.: US 6,187,195 B1
(45) Date of Patent: Feb. 13, 2001

(54) INHIBITION AND DELAY OF DEPOSIT FORMATION IN MEMBRANE PROCESSES

(75) Inventors: Wolfgang Zarges, Köln; Torsten Groth, Odenthal; Winfried Joentgen, Köln; Andreas Gröschl, Leverkusen, all of (DE)

(73) Assignee: Bayer AG, Leverkusen (DE)

(*) Notice: Under 35 U.S.C. 154(b), the term of this patent shall be extended for 0 days.

(21) Appl. No.: 09/297,901

(22) PCT Filed: Nov. 3, 1997

(86) PCT No.: PCT/EP97/06065

§ 371 Date: May 10, 1999

§ 102(e) Date: May 10, 1999

(87) PCT Pub. No.: WO98/22205

PCT Pub. Date: May 28, 1998

(30) Foreign Application Priority Data

Nov. 15, 1996 (DE) .................................. 196 47 293

(51) Int. Cl.[7] .................................................. B01D 65/02
(52) U.S. Cl. .................. 210/636; 210/639; 210/650; 210/700; 252/180; 528/328
(58) Field of Search .................. 210/639, 500.38, 210/650, 652, 698–701, 636; 252/180, 181; 528/328

(56) References Cited

U.S. PATENT DOCUMENTS

| | | | |
|---|---|---|---|
| 4,534,881 | 8/1985 | Sikes et al. | 252/180 |
| 4,839,461 | 6/1989 | Boehmke | 528/363 |
| 5,256,303 | 10/1993 | Zeiher et al. | 210/700 |
| 5,286,810 * | 2/1994 | Wood | 210/698 |
| 5,288,783 * | 2/1994 | Wood | 525/418 |
| 5,357,004 | 10/1994 | Calton et al. | 525/435 |
| 5,373,086 * | 12/1994 | Koskan et al. | 525/328 |
| 5,466,760 * | 11/1995 | Wood | 525/435 |
| 5,493,004 | 2/1996 | Groth et al. | 528/363 |
| 5,506,335 * | 4/1996 | Uhr et al. | 210/700 |
| 5,523,023 * | 6/1996 | Kleinstuck et al. | 252/180 |
| 5,525,257 * | 6/1996 | Kleinstuck et al. | 252/180 |
| 5,574,113 * | 11/1996 | Kroner et al. | 252/180 |
| 5,698,512 * | 12/1997 | Austin et al. | 252/180 |
| 5,708,126 * | 1/1998 | Wood et al. | 528/328 |
| 5,876,623 * | 3/1999 | Tang et al. | 252/180 |
| 5,888,401 * | 3/1999 | Nguyen | 210/650 |

FOREIGN PATENT DOCUMENTS 0705794 4/1996 (EP).

OTHER PUBLICATIONS

Chemical Abstracts, vol. 104, p. 343 (abstract 56102) (1986).
Rautenbach, et al., "Membranverfahren in der Umwelttechnik," Chem.–Ing. Tech. 59, pp. 187–196 (1987).
Journal of Organic Chemistry, vol. 26, pp. 1084–1091 (1961).
Abstract of Desalination, vol. 54, pp. 263–276 (1985).

* cited by examiner

*Primary Examiner*—Joseph W. Drodge
(74) *Attorney, Agent, or Firm*—Connolly Bove Lodge and Hutz LLP

(57) ABSTRACT

The invention relates to the use of polyaspartic acids and their mixtures with surfactants and emulsifiers for inhibiting or delaying deposit formation by sparingly soluble organic and inorganic components in the feed of a process that uses a membrane.

20 Claims, 2 Drawing Sheets

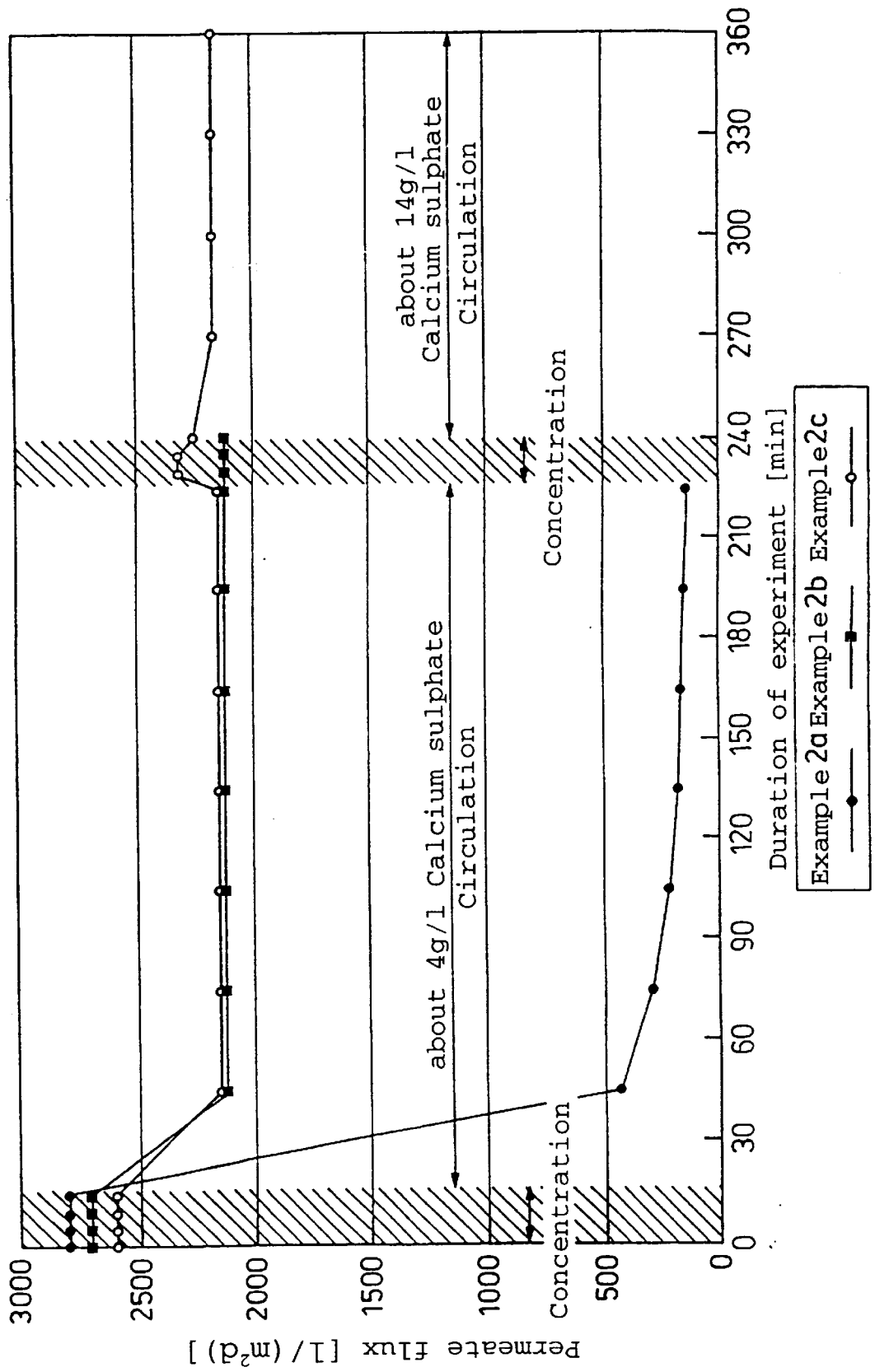

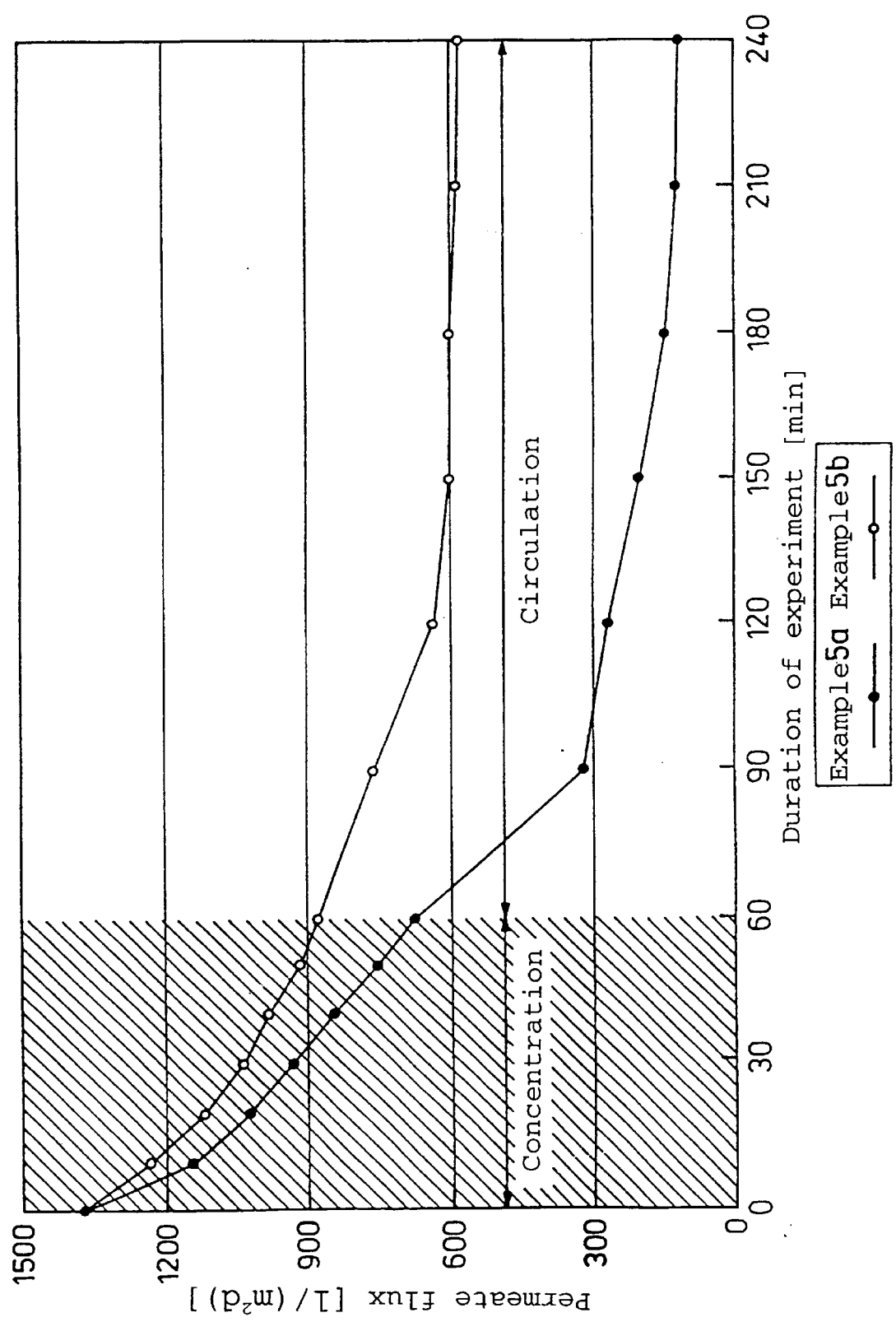

INHIBITION AND DELAY OF DEPOSIT FORMATION IN MEMBRANE PROCESSES

BACKGROUND OF THE INVENTION

This application is a 371 of International Application PCT/EP97/06065, filed on Nov. 3, 1997.

The invention relates to the use of polyaspartic acids and their mixtures with surfactants and emulsifiers for inhibiting or delaying deposit formation by sparingly soluble organic and inorganic components in the feed of membrane processes.

Membrane technology plays an important role in the separation of fluidized systems. Obtaining drinking water from sea water by means of reverse osmosis as well as the breaking up of products by means of ultrafiltration and nanofiltration are now among the established processes in industry.

In membrane processes, as a rule dilute solutions are concentrated and organic solvents, water or salt solutions are separated off. Either valuable substances or pollutants in concentrated and possibly low-salt solutions are obtained, with the result that subsequent storage, transport, disposal and further processing can be carried out more economically. In the case of wastewater treatment, the aim of membrane treatment is to obtain the major part of the volume as permeate in an uncontaminated or only slightly contaminated form, for example for reuse. The concentrated retentate can be worked up at relatively low cost for valuable substances still present or can be disposed of more economically in this concentrated form, for example by incineration.

The area of membrane processes includes very different processes. The membranes and their technical designs, the modules, also differ correspondingly. Commercial membranes are produced, for example, from organic materials, such as polysulphone, cellulose acetate, polyamide or PVDF, or inorganic materials, such as $TiO_2$, $ZrO_2$ or $Al_2O_3$; they are used in the form of capillary, tubular or flat membranes.

Industrially relevant membrane separation processes are predominantly operated as crossflow filtrations. High wall shear stresses, realized by high flow velocities and special module constructions, are intended to minimize or inhibit soiling of the membrane. In general, however, a decrease in the permeate output due to fouling or the accumulation of material on the membrane, is nevertheless found during the concentration of feedstreams in industrial membrane processes.

Scaling, the encrustation of the membrane by inorganic salts as a result of exceeding their solubility limit, is a special case of fouling. The calcium and magnesium carbonates, hydroxides, phosphates, sulphates and fluorides due to the hardness of the water may be primarily mentioned here as inorganic salts. In wastewater treatment, heavy metal hydroxides, such as, for example, iron and chromium hydroxides, constitute an additional problem. Scaling is always to be expected if high permeate yields are strived for in a process, such as, for example, in wastewater concentration and the recovery of pure water and drinking water. However, this phenomenon can of course also occur in desalination and concentration of product solutions. Membrane processes considered here are ultra- and nanofiltration, reverse osmosis, dialysis and perevaporation.

Fouling and scaling as a special instance of fouling result in the permeate output of a membrane plant finally decreasing to an uneconomically low level. From time to time, the feedstream must therefore be shut off and the membrane cleaned. However, such a cleaning process has several disadvantages. Cleaning means interrupting operation. Continuous operation can thus be maintained only by keeping a parallel membrane apparatus in reserve. Furthermore, depending on the type of deposits, it is necessary to use chemical cleaning agents which frequently contain poorly biodegradable surfactants and complexing agents and have to be disposed of separately. Finally, the entire deposit is in general not removed during cleaning and the membranes therefore seldom achieve their original permeate flow when they are used again.

If in a process scaling is expected, pretreatment measures, for example, by the use of ion exchangers which are known from the field of water softening, can be taken to inhibit said scaling. Furthermore, the controlled introduction of solids particles in the seeding and fluidized-bed technique permits physical control of membrane encrustation in the case of certain scalant and module systems (Chem.-Ing.-Tech. 59 (1987) 187). Hydroxide deposits can often be avoided by establishing suitable pH values. Furthermore, there has been no lack of attempts to add complexing agents, such as NTA and EDTA, to the feedstream to be processed. In addition to the not uncontested disadvantageous ecotoxicological properties, the complexing agents must be added in equimolar amounts. In contrast to the complexing agents, dispersants, so-called threshold inhibitors, can be effectively used in substoichiometric amounts for inhibiting or delaying fouling and scaling in membrane processes.

In Desalination 54, 263–76 (1985), cited in Chem. Abstracts, 104, 56 102, polyphosphates, phosphonates, polystyrenesulphonates, polyacrylamides and polyacrylates are investigated with regard to the scale-inhibiting action. In U.S. Pat. No. 5,256,303 the inhibition of calcium sulphate crystallization and of deposition in feedstreams which are passed through a membrane system is investigated. N-substituted polyacrylamides and phosphonobutane-1,2,4-tricarboxylic acid are used as scale inhibitors. A method for inhibiting the crystallization of sulphates in aqueous systems is described in EP 0 705 794. One or more polyamino acids and one or more inorganic phosphates are used but have to be disposed of by a complicated procedure because of eutrophication in waters from the main outfall. The preparation of high molecular weight polyaspartic copolymers, which can likewise be used as scale inhibitors in various industrial and hygiene areas, is described in U.S. Pat. No. 5,286,810; reverse osmosis membranes, too, are mentioned, without specific details. Mixtures of polyaspartic acids and their derivatives with other polycarboxylic acids and their use in water treatment are described in U.S. Pat. No. 5,525,257. Polyacrylates, polymaleates and polysulphonates are mentioned as polycarboxylic acids; here too, reverse osmosis is mentioned without further information. According to U.S. Pat. No. 5,466,760, copolymers of polysuccinimide from maleic acid, ammonia and a polyamine are used as inhibitors of salt deposits. EP-B 530 358 (=U.S. Pat. No. 5,373,086) describes a special polyaspartic acid composition which is obtained by heating pulverulent L-aspartic acid to at least 188° C. and condensation, further heating to at least 216° C. until at least 80% of the polysuccinimide formation has taken place and subsequent hydrolysis of the polysuccinimide, is present to an extent of over 50% in the β-form and has a molecular weight of 1000 to 5000 (weight average), which is used for inhibiting precipitation of $CaCO_3$ or $Ca_3(PO_4)_2$. This special polyaspartic acid is said to be capable of being used in a wide industrial area from process water treatment to oil production; reverse osmosis is also mentioned in passing, without further information.

In summary, it can therefore be said that, according to the prior art to date, phosphonates and polyacrylates were used for scale inhibition in membrane processes. Polyaspartic acids are mentioned in numerous publications as useful scale inhibitors. However, there were to date no results which demonstrate the usability of polyaspartic acids in membrane processes. It is known to a person skilled in the art that effective scale inhibition always depends on the total system, i.e. all components and conditions involved. Particularly in membrane processes, many interfering chemical and physical factors are present which make it unlikely that a scale inhibitor investigated with a good result in another field of use will also be effective precisely in membrane processes.

SUMMARY OF THE INVENTION

It has now surprisingly been found that, when polyaspartic acids and their mixtures with surfactants and emulsifiers are used in various membrane processes, inhibition and delay of scale formation by sparingly soluble organic and inorganic components on membranes can be achieved. The use of the biodegradable polyaspartic acids is advantageous since they can replace non-biodegradable or sparingly biodegradable phosphonates and polyacrylates, increase the availability of membrane plants and reduce the number of cleaning intervals.

The invention therefore relates to a process for carrying out membrane processes for the treatment of aqueous feeds with inorganic and organic ingredients with inhibition or delay of scale formation on the membranes by addition of a scale inhibitor, which is characterized in that polyaspartic acids and their mixtures with surfactants, emulsifiers or several of them are used as scale inhibitor, the polyaspartic acids being used in an amount of 1–50,000 ppm, based on the aqueous feed.

A further embodiment of the invention relates to the use of polyaspartic acids and their mixtures with surfactants and emulsifiers in the presence of polyacrylates or phosphonates, such as, for example, of phosphonobutanetricarboxylic acid, or several of them, since the biodegradability of such mixtures is improved by the addition of polyaspartic acids.

BRIEF DESCRIPTION OF THE DRAWINGS

FIG. 1 is a plot of permeate flux through a membrane versus duration of time in experiments described in Examples 2a, 2b and 2c in the Detailed Description of the Invention.

FIG. 2 is a plot of permeate flux through a membrane versus duration of time in experiments described in Examples 5a and 5b in the Detailed Description of the Invention.

DETAILED DESCRIPTION OF THE INVENTION

The polyaspartic acids to be used according to the invention can be prepared in various ways. Thus, the preparation can be effected from maleic anhydride, water and ammonia and/or the secondary products derived therefrom, such as, for example, maleic acid $NH_4$ salt, maleamic acid, aspartic acid, asparagine and iminodisuccinic acid. Their ammonium salts may also be used Mixtures in which all the abovementioned components are contained side by side can also be used for the preparation of polyaspartic acids. The preparation can also be carried out thermally from the abovementioned components in the presence of acidic catalysts, such as, for example, phosphoric acid, phosphonic acids, sulphonic acids or sulphuric acid, which are required for the synthesis of peptide bonds.

The polyaspartic acids or polysuccinimides initially arising from the condensation are as a rule subjected to a solvolysis or hydrolysis, preferably an alkali hydrolysis, optionally in the presence of amines, such as, for example, ethanolamines, or alcohols, such as, for example, ethylene glycol or propanetriol. The polyaspartic acids thus formed are preferably used in the form of their salts for inhibiting and delaying scale formation are. Preparation examples for the polyaspartic acids to be used according to the invention are contained in the following literature sources: in J. Org. Chem 26, 1084 (1961), polyaspartic acid is prepared by thermal condensation of aspartic acid. In U.S. Pat. No. 4,839,461, maleic acid and ammonia are reacted at 120–150° C. In U.S. Pat. No. 5,288,783, maleic acid and fumaric acid are reacted with ammonia at 170–350° C. In U.S. Pat. No. 5,493,004, polyaspartic acids are formed from the reaction of maleic anhydride and ammonia in a tube reactor. The product resulting therefrom can optionally be further polymerized in a high-viscosity reactor. Common to all preparation methods is that the initially formed polysuccinimides are then subjected to a solvolysis or hydrolysis, preferably an alkaline hydrolysis. However, amines, aminoalcohols and alcohols may also be used for the formation of derivatives.

Depending on the preparation process, the polyaspartic acids to be used according to the invention may contain the following structural elements in different amounts:

a) aspartic acid units

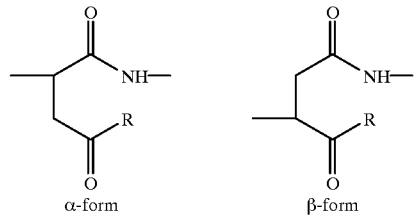

α-form          β-form b) succinimide units

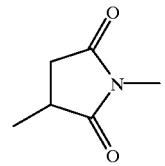

c) malic acid units

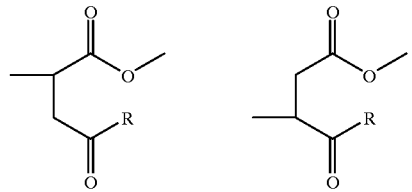

d) olefinic units

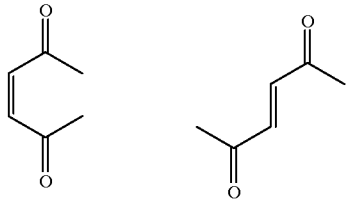

e) iminodisuccinic acid units

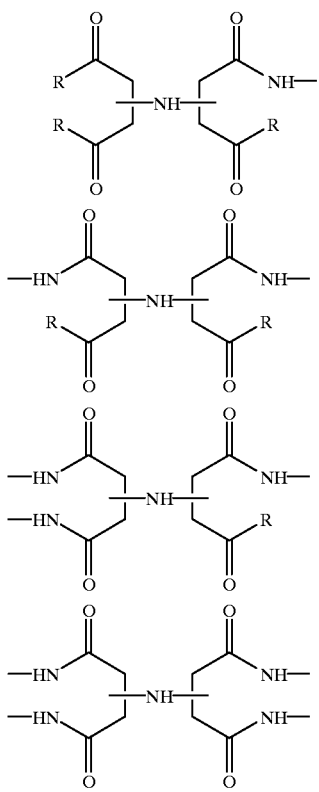

In all structural elements shown, R denotes = OH, ONa, OLi, OK, ONH$_4$, NH$_2$, OH$_3$NHCH$_2$CH$_2$OH, OH$_2$N(CH$_2$CH$_2$OH)$_2$, OHN(CH$_2$CH$_2$OH)$_3$ or OCH$_2$CH$_2$OH.

The polyaspartic acids to be used according to the invention may have molecular weights, based on the weight average value Mw from GPC (gel permeation chromatography), of 500–50,000, preferably of 1000–20,000 and particularly preferably of 1500–10,000.

The qualitative and quantitative determination of the structural elements is effected by means of NMR and FT-IR spectroscopy, mass spectrometry, HPLC, GC and elemental analysis. The peptide bonds may be present in the α- and β-form. In general, the polyaspartic acids comprise an α/β mixture, the proportion of the β-form being greater than the proportion of the α-form.

According to the invention, polyaspartic acids can be used in combination with a surfactant, especially an emulsifier. Anionic, cationic, nonionic and ampholytic surfactants (emulsifiers) are suitable. The anionic alkanesulphonates and the nonionic polyglycol ethers (alkoxylates) may be mentioned as examples. The use of linear alkanesulphonates and of polyglycol ethers of aliphatic alcohols is preferred. The use of linear $C_{12}$–$C_{17}$ alkanesulphonates and of unsaturated and/or saturated aliphatic $C_{10}$–$C_{20}$ alcohols which have been etherified with 6–60 ethylene oxide units is particularly preferred.

The mixtures of polyaspartic acids and optionally surfactants, especially emulsifiers, are such that they perform the function of delaying scale and inhibiting scale. If deposit formation by inorganic and organic salts of alkaline earth metal and heavy metal ions predominates, predominantly polyaspartic acids are used. If deposit formation by nonpolar organic substances predominates, surfactants (emulsifiers) are used to a greater extent. The ratios of polyaspartic acids to surfactants and/or emulsifiers may depend on the fouling and scaling in a membrane process. The weight ratio of polyaspartic acids to surfactants and/or emulsifiers can therefore be 100:0 to 1:99, preferably 100:0 to 10:90, particularly preferably 100:0 to 50:50.

Polyaspartic acids may be used both alone and in their mixtures with surfactants (emulsifiers) in combination with polyacrylates and phosphonates. The biodegradablity of the resulting active ingredient mixtures is increased compared with the biodegradability of the polyacrylates and phosphonates, without reducing the deposit-inhibiting effect.

Polyaspartic acids and their mixtures with surfactants (emulsifiers) are used in membrane processes at pH values of 3 to 12.5, preferably at 4.5 to 11, particularly preferably at 6 to 10. If the pH value is not determined by the feedstream used in the membrane process, any desired acids and bases can be used for adjusting the pH values, preferably those acids and bases which, with other feed ingredients, do not give sparingly soluble salts. However, the acids and bases should not have any harmful effect on the ingredients of the feedstream, on the metallic materials and membrane.

Polyaspartic acids and their mixtures with surfactants, specifically emulsifiers, are used in membrane processes at a temperature of 10 to 90° C., preferably 15 to 70° C., particularly preferably 20 to 50° C.

The membranes used in the membrane processes may consist of inorganic materials, such as, for example, ceramic, $TiO_2$, $ZrO_2$ or $Al_2O_3$, or of organic polymers, such as, for example, cellulose esters (cellulose acetate, cellulose acetobutyrate, cellulose acetopropionate), polyamides, polyimides, polyesters, polyethersulphone, polyetherketone, polysulphone or PVDF. In a preferred manner, the process according to the invention is applied to nanofiltration and ultrafiltration membranes of the stated materials. In a further preferred manner, the process according to the invention is applied to reverse osmosis membranes having a selective polyamide separation layer. In a particularly preferred manner, the selective separation layer for membranes of all stated processes consists of polyamide. All membranes used in the process according to the invention are asymmetrical in a manner known to a person skilled in the art or are of the thin-film composite type.

Polyaspartic acids and their mixtures with surfactants, specifically emulsifiers, can be used for inhibiting and delaying scale formation on membranes in membrane processes which are supplied with aqueous and solvent-containing aqueous feedstreams. In general, the feedstreams must be such that the active ingredients are initially present in dissolved form and can thus display their effect. For an optimal effect, the compound/salts causing the scaling/fouling should also initially be present in dissolved form and should not exceed the solubility limit until during the membrane process. Examples of feeds which can be treated according to the invention are: sea water, landfill seepage water, industrial and communal wastewaters, product streams having a scaling potential.

Polyaspartic acids and their mixtures with surfactants (emulsifiers) are added to the feedstream which is to be treated in a membrane plant in an amount of 1–50,000 ppm, preferably in an amount of 5–5000 ppm, particularly preferably in an amount of 10–500 ppm, very particularly preferably 50–500 ppm.

EXAMPLES

Example 1

A Lab 20 plate module was fitted with 1 plate each (=2 flat membranes) of an ultrafiltration membrane, of a nanofiltration membrane and of a reverse osmosis membrane from Desalination Systems, USA. At 25° C. and a module inlet pressure of 20 bar, the permeation rate was first determined with demineralized water. PAA (molecular weight about 6000) in two concentrations was then added to the feed. The effects on the permeation rates were observed.

Results:

| Addition of PAA | Permeate fluxes [l/(m₂d)] | | |
|---|---|---|---|
| | UF membrane | NF membrane | RO membrane |
| 0 ppm | 1200 | 2330 | 800 |
| 50 ppm | 1200 | 2330 | 800 |
| 500 pm | 1150 | 2430 | 880 |

Example 2 a) 200 l of a solution prepared from demineralized water and 2.0 g/l of $CaSO_4.2H_2O$ were concentrated, initially by 50%, using a nanofiltration membrane (sulphate retention>95%) in spiral module design (2.5 inches×40 inches, 47 mil spacer) (conditions: 25° C., 30 bar module outlet pressure, 1.25 m³/h module feed). In the circulation procedure i.e. with recycling of retentate and permeate to the reservoir, the permeate output was then repeatedly measured.

b) Example 2a) was repeated with the addition of 50 ppm of PAA (molecular weight 6000).

c) Example 2a) was repeated with the addition of 50 ppm of PAA (molecular weight 6000) and 1% of NaCl. After about 3 h in the circulation procedure, further concentration was now effected but a $CaSO_4.2H_2O$ concentration of about 14 g/l was realized in the feed.

Result

Without addition, the permeate flow broke down owing to crystallizing of $CaSO_4.2H_2O$ (solubility in $H_2O$ at 25° C. 2.9 g/l). With PAA 4.5 times supersaturation was realizable without deteriorations in the permeation rate. Added electrolytes did not interfere.

Result of Example 2

Permeate flux in $1/m^2 \cdot day$ as a function of the time under the conditions of Example 2a, 2b or 2c and achievable $CaSO_4$ concentrations.

| Time [min] | Permeate flux Example 2a [l/(m²d)] | Permeate flux Example 2b [l/(m²d)] | Permeate flux Example 2c [l/(m²d)] | Concentration $CaSO_4$ [g/l] |
|---|---|---|---|---|
| 0 | 2793 | 2700 | 2592 | about 2.0 |
| 5 | 2793 | 2700 | 2592 | about 2.5 |
| 10 | 2793 | 2700 | 2592 | about 3.0 |
| 15 | 2793 | 2700 | 2592 | about 4.0 |
| 45 | 432 | 2120 | 2140 | about 4.0 |
| 75 | 295 | 2120 | 2140 | about 4.0 |
| 105 | 216 | 2120 | 2140 | about 4.0 |
| 135 | 180 | 2120 | 2140 | about 4.0 |
| 165 | 162 | 2120 | 2140 | about 4.0 |
| 195 | 149 | 2120 | 2140 | about 4.0 |
| 225 | 139 | 2120 | 2140 | about 4.0 |
| 230 | | 2120 | 2314 | about 5.0 |
| 235 | | 2120 | 2314 | about 7.5 |
| 240 | | 2120 | 2250 | about 14 |
| 270 | | | 2160 | about 14 |
| 300 | | | 2160 | about 14 |
| 330 | | | 2160 | about 14 |
| 360 | | | 2160 | about 14 |

FIG. 1 shows the plot of the table.

Example 3

In the synthesis of a stilbene brightener containing sulpho groups, sodium bicarbonate fluidized with calcium phosphate was used. The product solution with $Ca_3(PO_4)_2$, $CaCO_3$, NaCl and the brightener as important ingredients was freed from the synthesis salt (NaCl) obtained, by means of tubular nanofiltration membranes (1.2 m module, ½") and concentrated to about 55% of the volume (module feed 1 m³/h, 55° C., 25 [lacuna] inlet pressure). The calcium content increased from 70 mg/l to 140 mg/l in the final concentrate. The solubility limit of $Ca_3(PO_4)_2$ of 20 mg/l was substantially exceeded. As a result of the addition of 100 ppm of PAA the permeate outputs achieved were the same as in the processing of product solution which contained no $Ca_3(PO_4)_2$, i.e. prepared without the use of fluidized sodium bicarbonate (permeate fluxes: 2300 $1/(m^2d)$ in diafiltration; 1000 $1/(m^2d)$ in concentration). After the experiment, the original permeate output could be achieved again by washing with water.

Example 4

500 ml of a solution containing 3 mmol of calcium chloride were added to 500 ml of a solution containing 1 mmol of sodium carbonate, 1 mmol of sodium sulphate and 1 mmol of sodium fluoride, the result is a solution which was 4.5 times supersaturated with respect to $CaF_2$ and 7 times supersaturated with respect to $CaCO_3$ and from which a bulky precipitate rapidly formed at pH>8 and a finely crystalline precipitate slowly formed at pH 5. When 50 ppm of PAA (molecular weight 6000) were added, the precipitates were not formed.

Example 5

Sulphuric acid-containing mother liquor from a dye production was neutralized by adding milk of lime before working up by the membrane method. After the neutralization sludge had been separated off, the solution now saturated with respect to gypsum was concentrated by means of nanofiltration membranes in spiral module design (2.5"×40", 47 mil, 30 bar module inlet pressure, 25° C., module feed 1250 l/h). The following experimental settings were compared:

a) The permeate flow was measured during the concentration to 20% of the initial volume and in a subsequent circulation procedure.

b) 50 ppm of a mixture of PAA and polyacrylic acid (3:1) were added to the feed.

Result

The permeate outputs in Example 5b) were significantly higher during the concentration and circulation phases than without addition.

Result of Example 5

Permeate flux in $l/m^2 \cdot day$ as a function of the time under the conditions of Example 5a or 5b and achievable $CaSO_4$ concentrations.

| Time [min] | Permeate flux Example 5a [l/(m²d)] | Permeate flux Example 5b [l/(m²d)] | Concentration CaSO₄ [g/l] |
|---|---|---|---|
| 0 | 1371 | 1371 | about 3.0 |
| 10 | 1143 | 1231 | about 3.5 |
| 20 | 1032 | 1116 | about 4.0 |
| 30 | 1000 | 1032 | about 5.0 |
| 40 | 889 | 980 | about 6.0 |
| 50 | 788 | 914 | about 8.5 |
| 60 | 667 | 873 | about 14.5 |
| 90 | 320 | 762 | about 14.5 |
| 120 | 267 | 632 | about 14.5 |
| 150 | 202 | 600 | about 14.5 |
| 180 | 145 | 600 | about 14.5 |
| 210 | 121 | 565 | about 14.5 |
| 240 | 114 | 533 | about 14.5 |

FIG. 2 shows the plot of the table.

What is claimed is:

1. Process for carrying out the treatment of an aqueous feed using at least one membrane, wherein the aqueous feed contains inorganic and organic scale forming ingredients and the process inhibits or delays scale formation on the at least one membrane, comprising adding polyaspartic acids in a mixture with surfactants or emulsifiers to the aqueous feed in an effective amount to inhibit or delay scale formation by the inorganic and organic ingredients, the polyaspartic acids mixture being used in an amount of 1 to 50,000 ppm, based on the aqueous feed.

2. Process according to claim 1, wherein the surfactants or emulsifiers comprise alkanesulphonates or alkoxylates.

3. Process according to claim 1, wherein the polyaspartic acids have a weight average Mw of 500 to 50,000, determined by gel permeation chromatography.

4. Process according to claim 1, wherein the polyaspartic acids are prepared from maleic anhydride and ammonia in the presence of water.

5. Process according to claim 4, wherein the polyaspartic acids are Na salts of polyaspartic acid.

6. Process according to claim 1, wherein the alkanesulphonates are $C_{12}$–$C_{17}$-alkanesulphonates and the alkoxylates are polyethers based on unsaturated and/or saturated $C_{10}$–$C_{20}$-alkanols which have been etherified with 6 to 60 ethylene oxide units.

7. Process according to claim 1, wherein the process is carried out at a pH value of from 3 to 12.5.

8. Process according to claim 1, wherein the weight ratio of polyaspartic acids to surfactants or emulsifies is from 100:0 to 1:99.

9. Process according to claim 1, wherein the at least one membrane is selected from the group consisting of nanofiltration membranes and ultrafiltration membranes.

10. Process according to claim 1, wherein the at least one membrane comprises a reverse osmosis membrane having a selective separation layer of polyamide.

11. The process of claim 1, wherein the polyaspartic acids have a weight average Mw of 1,000 to 20,000, determined by gel permeation chromatography.

12. The process of claim 1, wherein the polyaspartic acids have a weight average Mw of 1,500 to 10,000, determined by gel permeation chromatography.

13. Process according to claim 1, wherein the polyaspartic acids are prepared by a process comprising subjecting at least one substance selected from the group consisting of maleic acid $NH_4$ salt, maleamic acid, aspartic acid, asparagine and iminodisuccinic acid to thermal condensation to give at least one polysuccinimide which is subsequently subjected to solvolysis or hydrolysis to produce polyaspartic acid salts.

14. Process according to claim 13, wherein the thermal condensation is performed in the presence of an acidic catalyst.

15. Process according to claim 14, wherein the acidic catalyst is at least one substance selected from the group consisting of phosphoric acid, phosphonic acids, sulphonic acids and sulphuric acid.

16. Process according to claim 1, wherein the polyaspartic acids are prepared by a process comprising subjecting an ammonium salt of at least one substance selected from the group consisting of maleamic acid, aspartic acid, asparagine and iminodisuccinic acid to thermal condensation to give at least one polysuccinimide which is subsequently subjected to solvolysis or hydrolysis to produce polyaspartic acid salts.

17. Process according to claim 16, wherein the thermal condensation is performed in the presence of an acidic catalyst.

18. Process according to claim 17, wherein the acidic catalyst is at least one substance selected from the group consisting of phosphoric acid, phosphonic acids, sulphonic acids and sulphuric acid.

19. Process according to claim 1, wherein the process is carried out at a pH value of from 4.5 to 11.

20. Process according to claim 1, wherein the process is carried out at a pH value of from 6 to 10.

* * * * *